Figure 1:
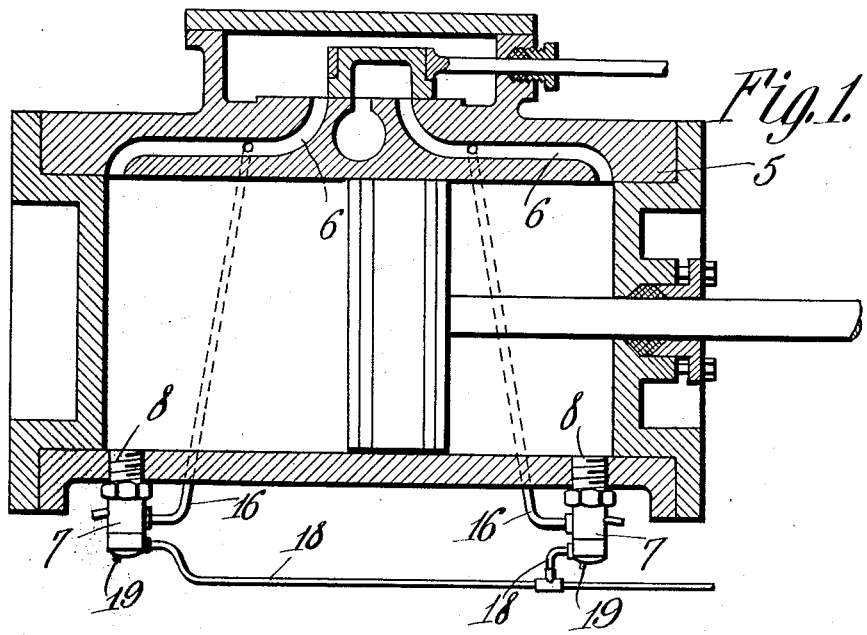

C. P. WHITE.
CYLINDER RELIEF VALVE.
APPLICATION FILED MAY 10, 1909.

933,147.

Patented Sept. 7, 1909.

Charles P. White
Inventor

Witnesses

By CA Snow & Co.
Attorneys

UNITED STATES PATENT OFFICE.

CHARLES P. WHITE, OF GREENSBORO, NORTH CAROLINA.

CYLINDER RELIEF-VALVE.

933,147.  Specification of Letters Patent.  Patented Sept. 7, 1909.

Application filed May 10, 1909. Serial No. 494,999.

*To all whom it may concern:*

Be it known that I, CHARLES P. WHITE, a citizen of the United States, residing at Greensboro, in the county of Guilford and State of North Carolina, have invented a new and useful Cylinder Relief-Valve, of which the following is a specification.

This invention relates to improvements in cylinder relief valves of that kind which open automatically when steam is shut off in the cylinder, and which close when steam is turned thereinto.

It is the object of the present invention to provide a valve of the kind stated which is simple in structure, and efficient in operation, and also to provide a valve which may be opened, when necessary, by fluid pressure.

With the foregoing objects in view the invention consists in a novel construction and arrangement of parts to be hereinafter described and claimed, reference being had to the drawing hereto annexed forming a part of this specification, in which drawing—

Figure 2:
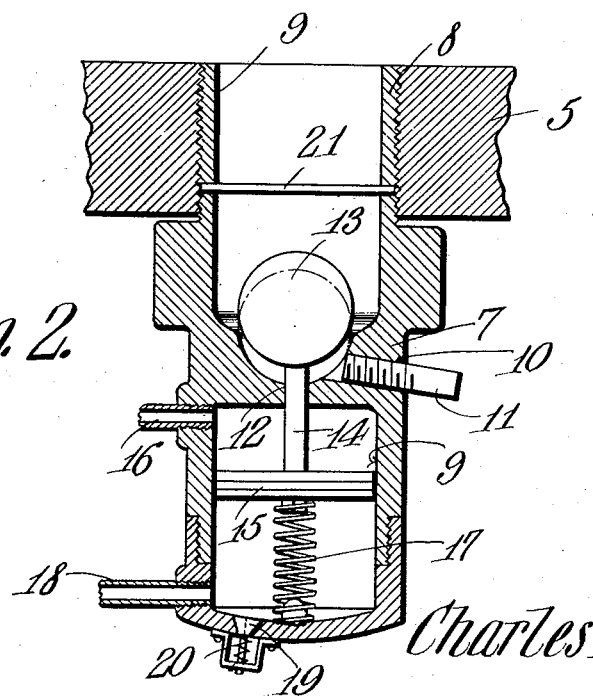

Figure 1 is a longitudinal sectional view of a steam engine cylinder showing the application of the invention, the relief valves being shown in elevation. Fig. 2 is an enlarged vertical sectional view of one of the relief valves.

In the drawings, 5 denotes a steam engine cylinder, and 6 are the steam ports to the respective ends thereof. Each end of the cylinder is equipped with the relief valve which is the subject of the present invention, and as said valves are identical in structure and in operation, a description of one will suffice for both.

At 7 is indicated the casing of the relief valve, said casing being provided with a threaded nipple 8 screwing into the cylinder wall, whereby said casing is mounted on the cylinder. The bore 9 of the casing opens into the bore of the cylinder.

The valve casing is provided with an outlet 10 fitted with a discharge pipe 11, and adjacent to this outlet, a partition 12 extends across the bore of the casing. This partition has a concavity on one side in which is adapted to seat a ball 13. The outlet is so located with respect to the partition, that when the ball is seated as stated, it also closes the outlet, the ball thus forming a valve which controls the outlet 10. The ball 13 is formed with a stem 14 which extends through a central opening in the partition 12, and carries a piston 15 which works in that portion of the bore 9 on that side of the partition opposite that on which the ball seats.

Between the piston 15 and the partition 12, the casing 7 is entered by a pipe 16, which leads from one of the ports 6 of the cylinder 5. The pipe 16 of one of the relief valves extends from one of the steam ports, and the pipe 16 of the other relief valve extends to the other port, the relief valves being thus connected to the steam port of that end of the cylinder on which they are mounted.

Between the end wall of the casing 7 and the piston 15, the bore of the casing contains a spring 17 which bears against the piston and serves to move the same in a direction to open the valve 13 when pressure is shut off from the piston. The pipe 16 enters the casing 7 on one side of the piston, and the spring engages the opposite side thereof. The casing on the last-mentioned side of the piston is also entered by a pipe 18 leading from the boiler, or a source of compressed air. This portion of the valve casing is also provided with a vent valve 19 which is normally held closed by a spring 20.

The operation of the relief valve is as follows: When the engineer opens the throttle, the steam ports 6 are alternately placed in communication with the respective relief valves, the steam being carried to the casing 7 through the pipe 16, and entering said casing above the piston 15 whereby it is moved downwardly in a direction to close the valve 13. When steam is shut off in the cylinder, the spring 17 moves the piston 15 in a direction to open the valve whereupon the water of condensation is permitted to escape through the discharge pipe 11. In order to prevent the valve 13 from entering the cylinder 5 in case the stem 14 should break off, there is mounted in the bore 9, a suitable distance above the valve, a transversely extending pin 21. If the spring 17 should fail to open the valve, pressure may be let into the casing 7 below the piston through the pipe 18. The vent 19 is for the purpose of affording escape of any condensation which may leak past the valve and piston. The vent can be readily opened upon pushing against the same by a pin or other suitable device.

A relief valve constructed as herein described has no complicated parts to get out of order, and it is efficient and entirely automatic in operation requiring no attention save an occasional opening of the vent.

What is claimed is:

1. The combination with a steam engine cylinder, of a relief valve, comprising a casing in communication with the cylinder, and having an outlet, a normally open valve controlling the outlet, a piston connected to the valve, and a connection between the valve casing and a steam port of the cylinder for operating the piston to close the valve when steam is admitted into the cylinder.

2. The combination with a steam engine cylinder, of a relief valve, comprising a casing in communication with the cylinder, and having an outlet, a normally open valve controlling the outlet, a piston connected to the valve, a connection between a steam port of the cylinder and the casing on one side of the aforesaid piston, and a fluid pressure supply pipe to the casing on the other side of the piston.

3. The combination with a steam engine cylinder, of a relief valve comprising a casing containing a partition, and having an outlet on one side of the partition, said partition having an opening, a normally open valve controlling the aforesaid outlet, and provided with a stem extending through the opening in the partition, a piston carried by the stem, a connection between one of the steam ports of the cylinder, and the casing on one side of the piston, and a spring engageable with the other side of the piston.

4. The combination with a steam engine cylinder, of a relief valve comprising a casing containing a partition, and having an outlet on one side of said partition, the partition having an opening, a normally open valve controlling the aforesaid outlet, and provided with a stem extending through the opening in the partition, a piston carried by the stem, a connection between one of the steam ports of the cylinder and the casing on one side of the piston, and a fluid pressure supply pipe entering the casing on the opposite side of the piston.

5. The combination with a steam engine cylinder, of a relief valve comprising a casing containing a partition having on one side a concavity and an opening, said casing having an outlet adjacent to the partition, a spherical valve seating in the concavity of the partition, and covering the outlet when seated, a stem extending from the valve through the opening in the partition, a piston carried by the stem, a connection between one of the steam ports of the cylinder and the casing on one side of the piston, and a spring engaging the other side of the piston for holding the valve normally open.

In testimony that I claim the foregoing as my own, I have hereto affixed my signature in the presence of two witnesses.

CHARLES P. WHITE.

Witnesses:
E. L. SIDES,
W. P. HUTTON.